United States Patent
Townson

(10) Patent No.: US 11,566,453 B2
(45) Date of Patent: Jan. 31, 2023

(54) STRIKER MOUNTED ENDGATE DAMPER

(71) Applicant: GM GLOBAL TECHNOLOGY OPERATIONS LLC, Detroit, MI (US)

(72) Inventor: James M. Townson, Clarkston, MI (US)

(73) Assignee: GM Global Technology Operations LLC, Detroit, MI (US)

(*) Notice: Subject to any disclaimer, the term of this patent is extended or adjusted under 35 U.S.C. 154(b) by 803 days.

(21) Appl. No.: 16/443,191

(22) Filed: Jun. 17, 2019

(65) Prior Publication Data

US 2020/0392765 A1    Dec. 17, 2020

(51) Int. Cl.
| | |
|---|---|
| E05B 77/38 | (2014.01) |
| B62D 33/03 | (2006.01) |
| E05B 85/04 | (2014.01) |
| B62D 33/037 | (2006.01) |

(52) U.S. Cl.
CPC .............. *E05B 77/38* (2013.01); *B62D 33/03* (2013.01); *B62D 33/037* (2013.01); *E05B 85/04* (2013.01); *E05Y 2900/516* (2013.01); *E05Y 2900/546* (2013.01)

(58) Field of Classification Search
CPC ......... E05B 77/38; E05B 85/04; B62D 33/03; B62D 33/037; E05Y 2900/516; E05Y 2900/546
See application file for complete search history.

(56) References Cited

U.S. PATENT DOCUMENTS

| | | | | |
|---|---|---|---|---|
| 3,296,694 | A * | 1/1967 | De Mastry | B23P 11/005 29/520 |
| 3,350,128 | A * | 10/1967 | Martens | E05B 85/045 292/341.12 |
| 3,572,797 | A * | 3/1971 | Shay | E05B 85/045 292/341.12 |
| 3,591,225 | A * | 7/1971 | Hagemeyer | E05B 85/045 292/341.12 |
| 3,680,902 | A * | 8/1972 | Slattery | E05B 85/045 292/341.14 |
| 3,848,911 | A * | 11/1974 | Watermann | E05B 77/38 292/216 |
| 4,357,039 | A * | 11/1982 | Tolle | E05B 85/045 292/341.12 |
| 6,601,885 | B1 * | 8/2003 | Yiu | F16B 35/048 292/DIG. 53 |
| 7,481,479 | B1 | 1/2009 | Townson et al. | |
| 8,376,425 | B2 * | 2/2013 | Paskonis | E05B 85/045 292/341.15 |
| 9,493,968 | B2 * | 11/2016 | Fannon | E05B 77/38 |
| 2009/0295196 | A1 * | 12/2009 | Bambenek | E05B 85/045 296/207 |

* cited by examiner

*Primary Examiner* — Mark A Williams

(57) ABSTRACT

An endgate striker assembly engageable with an endgate latch, wherein the endgate striker assembly has a striker and an overmolded-annular shoulder. The striker has an attachment portion at one end, a head at the opposite end and a cylindrical shaft between the attachment portion and the head. The overmolded-annular shoulder is between the cylindrical shaft and the attachment portion. The overmolded-annular shoulder has an annular damper and an annular shoulder. The annular damper is molded over the surface of the annular shoulder facing the cylindrical shaft and at least part of the outer circumferential surface of the annular shoulder.

19 Claims, 4 Drawing Sheets

STRIKER MOUNTED ENDGATE DAMPER

TECHNICAL FIELD

This invention relates to an endgate latching system and more particularly to an endgate striker assembly having an annular damper.

BACKGROUND

A pickup truck or a trailer is equipped with an endgate at the open end of a cargo box. The endgate is a rigid member hinged to the cargo box for movement between a closed position in which the endgate closes off the open end to retain cargo inside the cargo box of the truck or trailer, and an open position in which the endgate projects rearward, permitting greater access to the area within the cargo box. The endgate is held in the closed position when an endgate mounted latch engages a striker mounted to a side panel of the cargo box.

SUMMARY

An endgate striker assembly is provided that is engageable with an endgate latch and includes a striker and an overmolded-annular shoulder, and optionally a striker collar and/or a fastener. The striker has an attachment portion at one end, a head at the opposite end and a cylindrical shaft between the attachment portion and the head. The overmolded-annular shoulder is between the cylindrical shaft and the attachment portion and includes an annular damper and an annular shoulder. The annular shoulder has a first surface facing the cylindrical shaft and an outer circumferential surface, and the annular damper is molded over the first surface and at least a part of the outer circumferential surface.

An endgate closure is also provided. The endgate closure includes an endgate striker assembly having an annular damper and an endgate latch having a latch surface. The endgate latch is engageable with the endgate striker assembly. When the endgate latch and the endgate striker assembly are engaged and stationary (e.g., without exogenous forces, road vibrations, or lateral forces, among others being applied to the endgate closure), there is a gap of between about 0.1 mm and about 2 mm between the latch surface and the annular damper.

Also disclosed is a cargo box having (a) at least one side panel having a striker hole, (b) an endgate striker assembly extending through the striker hole, and (c) an endgate having an endgate latch that is engageable with the endgate striker assembly. The endgate striker assembly has (i) a striker having an attachment portion at one end, a head at the opposite end, and a cylindrical shaft between the attachment portion and the head, (ii) an overmolded-annular shoulder, and (iii) a fastener couplable to the attachment portion. The striker hole has a first side facing the endgate latch and a second side facing away from the endgate latch. The head, the cylindrical shaft, and the overmolded-annular shoulder of the endgate striker assembly extend from the first side and the attachment portion coupled to the fastener extends from the second side of the striker hole. The cylindrical shaft of the striker is between the head and the overmolded-annular shoulder, and the overmolded-annular shoulder is between the cylindrical shaft and the first side of the striker hole. When the endgate latch and the endgate striker assembly are engaged and stationary, there is a gap of between about 0.1 mm and about 2 mm between the endgate latch surface facing the endgate striker assembly and the overmolded-annular shoulder.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Figure 1:
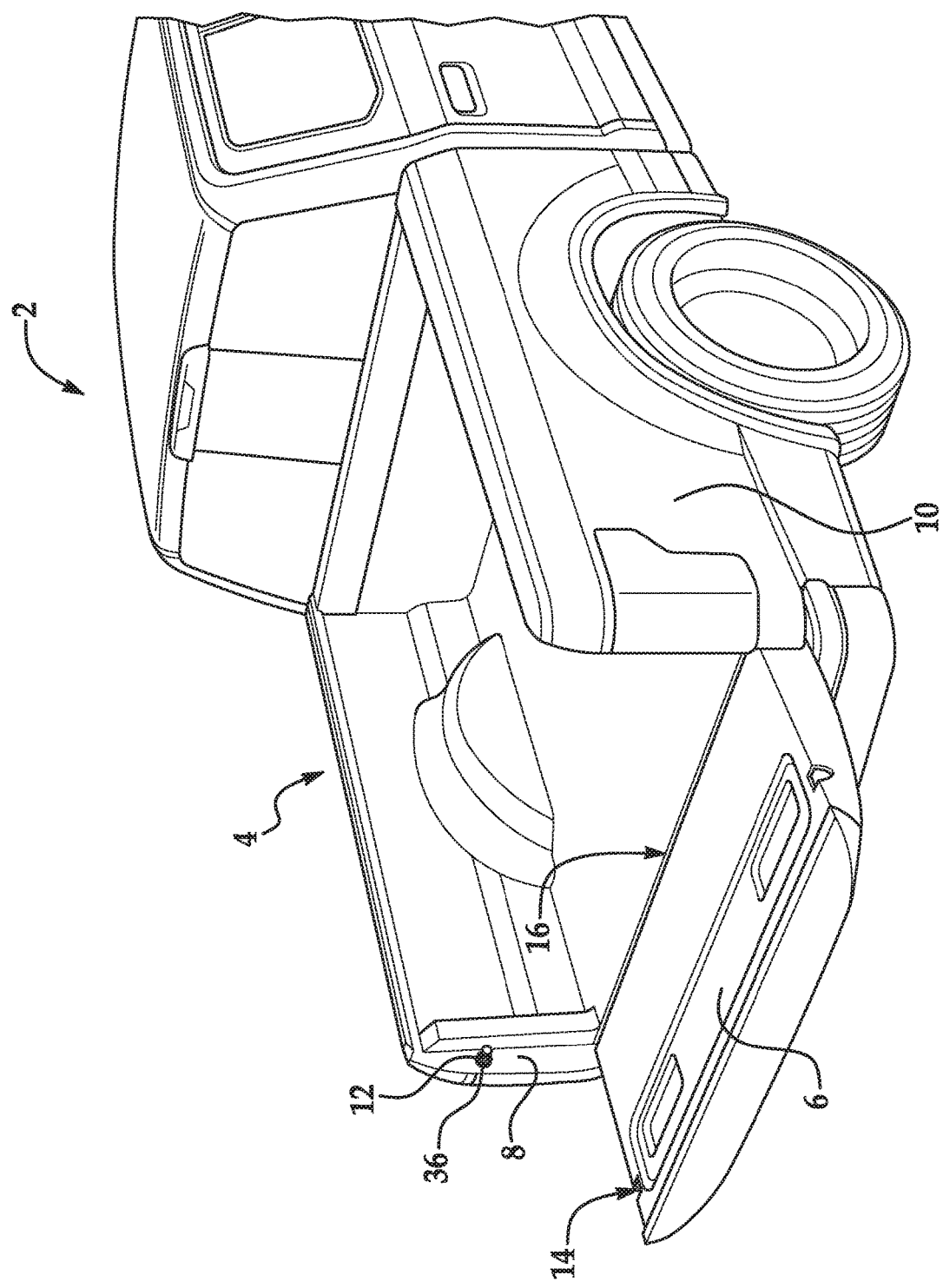
FIG. 1 is a rear perspective view of a cargo box having an endgate striker assembly and an endgate latch.
Figure 2A:
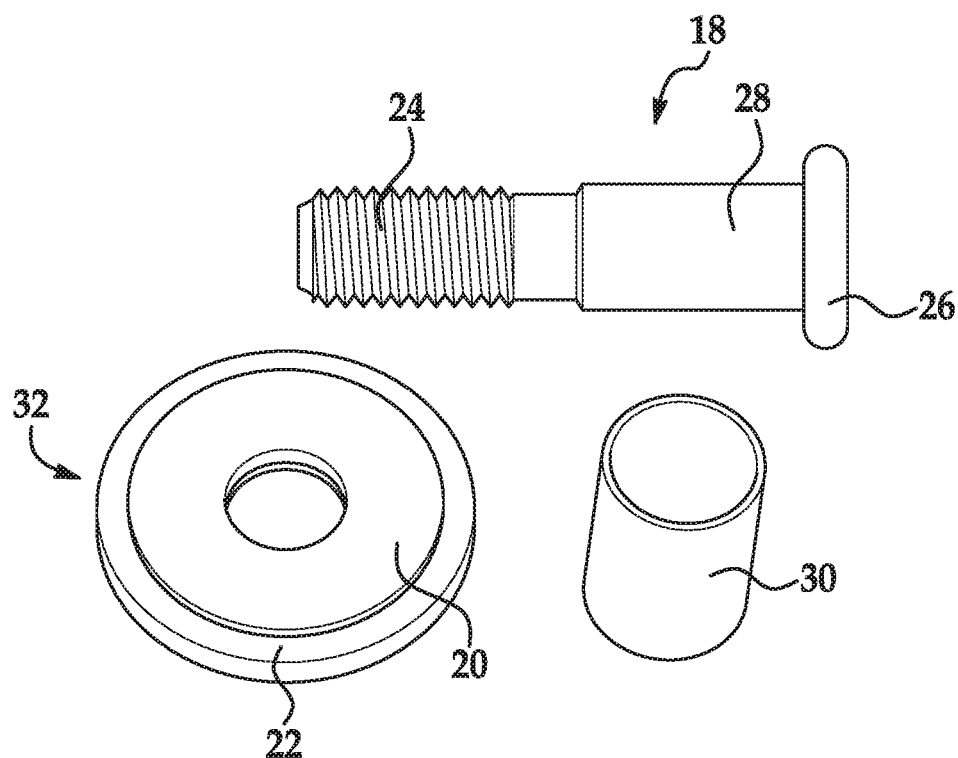
FIG. 2A is a perspective view of a disassembled endgate striker assembly having an overmolded-annular shoulder and FIG. 2B is a perspective view of the assembled endgate striker assembly.
Figure 2B:
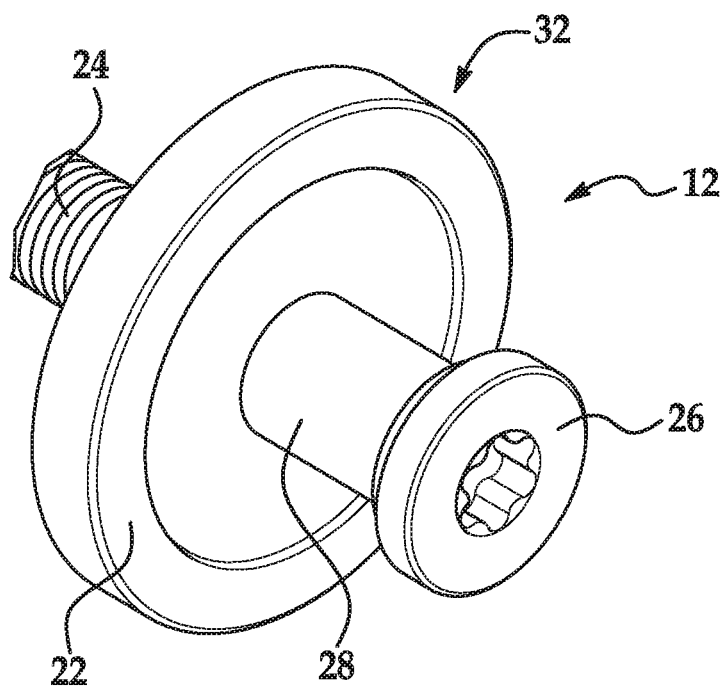
Figure 3A:
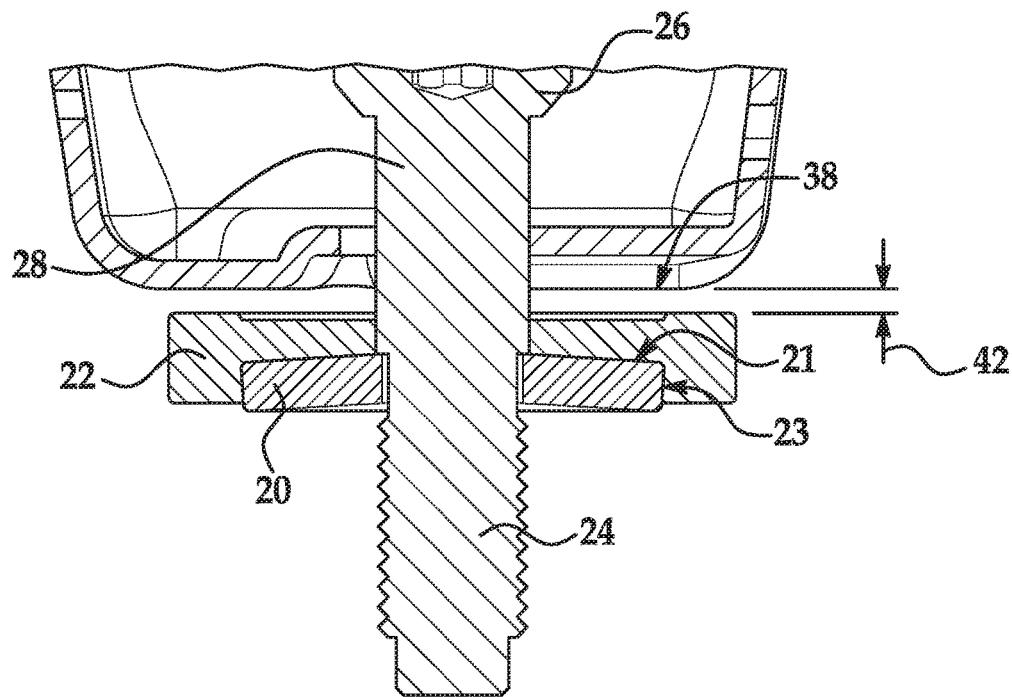
FIG. 3A is a cross-sectional view of an endgate closure including an endgate striker assembly having an overmolded-annular shoulder and FIG. 3B is an enlarged cross-sectional view of an overmolded-annular shoulder on a striker.
Figure 3B:
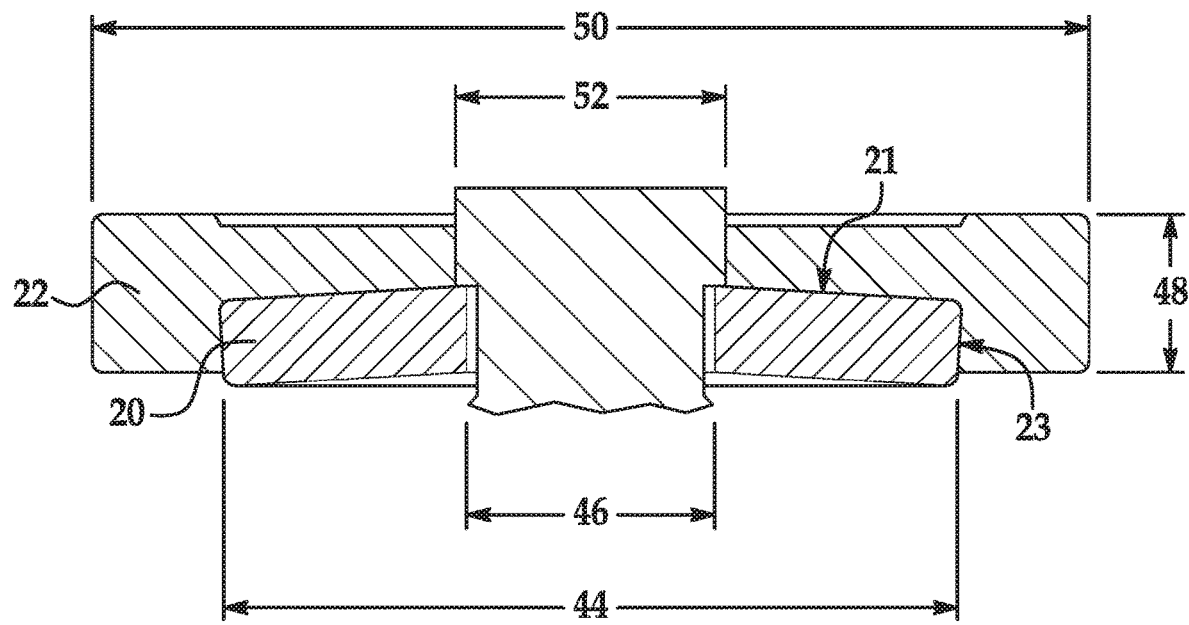

Referring to the drawings, any reference to left, right, front or back are used as a matter of convenience and are determined by facing the normal direction of highway travel by the truck 2 or trailer (not shown) having a cargo box 4 and its endgate 6. A pickup truck 2 having a cargo box 4 is shown in FIG. 1. The cargo box 4 has a left-side panel 8 and an opposing right-side panel 10. Each side panel 8, 10 and/or the endgate 6 can be a single body stamping or each panel or the endgate 6 can be an assembly of body components made from other manufacturing processes connected together. The endgate 6 extends substantially from one side panel 8 to the other side panel 10 and forms the back of the cargo box 4. In the closed position, the endgate 6 closes off the open end to retain cargo inside the cargo box 4 of the truck 2 or trailer, and in the open position the endgate 6 projects rearward, permitting greater access to the area within the cargo box 4.

In FIG. 1, an endgate striker assembly 12 is shown mounted to side panel 8 of the cargo box 4 of a vehicle 2 or a trailer (not shown). As the endgate 6 is moved to its closed position about a hinge 16, an endgate latch 14 on the endgate 6 engages the endgate striker assembly 12, thereby retaining the endgate 6 in its closed position until a user releases (directly or indirectly) the endgate latch 14. In addition, or in the alternative, an endgate striker assembly (not shown) is mounted to side panel 10 of the cargo box 4 and an endgate latch 14 is on the end closest to side panel 10 in a mirror image configuration of the endgate latch 14 and striker assembly 12 closest to side panel 8. FIG. 1 shows the endgate 6 with a hinge 16 at the bottom of the cargo box 4; however, the endgate 6 can alternatively be hinged at the left- or right-side panel 8 or 10 (not shown). When the endgate 6 is hinged at a side panel 8 or 10, an endgate latch is mounted at the end of the endgate 6 opposite the end that is hinged and an endgate striker assembly 12 is mounted to the side panel closest to the endgate latch so that it can be engaged by the latch.

An endgate striker assembly 12 engageable with an endgate latch 14 for a cargo box 4 is shown in FIGS. 2A-4. An endgate striker assembly 12 has a striker 18 (also sometimes referred to as a "striker bolt') and an overmolded-annular shoulder 32. The striker 18 includes an attachment portion 24 at one end, a head 26 at the opposite end, and a cylindrical shaft 28 between the attachment portion 24 and the head 26. The overmolded-annular shoulder 32 is between the cylindrical shaft 28 and the attachment portion 24. The overmolded-annular shoulder 32 has an annular damper 22 and an annular shoulder 20. The annular shoulder 20 has a first surface 21 facing the cylindrical shaft 28 and an outer circumferential surface 23, and the annular damper 22 is molded over the first surface 21 and at least part of the outer circumferential surface 23. The annular damper 22 can be molded over greater than about 80%, greater than about 90%, or greater than about 95% of the circumferential surface 23 in some aspects. In certain aspects the annular damper 22 can be molded over the first surface 21 and substantially the entire outer circumferential surface 23. The endgate striker assembly 12 can have an optional striker collar 30 that is sleeved over the cylindrical shaft 28. Also, the endgate striker assembly 12 can include an optional fastener 34 that couples to the attachment portion 24 and an optional washer 40.

The attachment portion 24 is the portion of the striker 18 used to attach the endgate striker assembly 12 to a side panel 8 or 10 of a cargo box 4 of a vehicle body or trailer. The attachment portion 24 can be inserted through a striker hole 36 (FIG. 1) in side panel 8 or through a striker hole (not shown) in side panel 10 and coupled to a fastener 34 (e.g., a nut, among others) to secure an endgate striker assembly 12 to side panel 8 or 10, respectively. As an example, in FIGS. 2A, 2B and 3A the attachment portion 24 is shown as a threaded bolt portion that has external threads. The threaded bolt portion 24 extends through a striker hole 36 in side panel 8 of a cargo box 4 or a striker hole (not shown) in side panel 10, and the external threads of the striker 18 engage with the internal threads of a nut 34 on the opposite side of the striker hole 36 in a side panel to mount the endgate striker assembly 12 such that the cylindrical shaft 28 (optionally sleeved in a collar) is exposed in the cargo box 4 opening and can engage with an endgate latch 14 when the endgate 6 is closed. An optional washer 40 can be threaded on the striker between the striker hole 36 and an engaged nut 34. When mounted to a side panel, the striker 18 of an endgate striker assembly 12 can be positioned so that it is substantially transverse to a side panel 8 or 10.

It should be noted that the attachment portion 24 can have other configurations within the scope of the claims. For example, the attachment portion 24 can be an unthreaded tenon that is flattened (and thereby widened) by peening after the tenon is inserted through a striker hole in a side panel.

The overmolded-annular shoulder 32 has an annular shoulder 20 over which an annular damper 22 is molded. Overmolding is a process where a layer of material (e.g., an elastomer) can be molded over another component (e.g., an annular shoulder). In some aspects, an annular shoulder (e.g., a steel annular shoulder) can be first placed in an injection mold and the hot molding material (e.g., an elastomer) fills the area around the inserted annular shoulder. The result can be an assembled overmolded-annular shoulder 32.

The annular shoulder 20 has a larger outer diameter 44 than the attachment portion 24 and the cylindrical shaft 28; the larger outer diameter 44 of the annular shoulder 20 prevents over-insertion of the endgate striker assembly 12 through a striker hole 36 in a side panel (e.g., the outer diameter 44 of the annular shoulder 20 is larger than the diameter of a striker hole in a side panel). The annular shoulder 20 can have an outer diameter 44 that is about twice its inner diameter 46, in some aspects. In certain aspects, the outer diameter 44 of the annular shoulder 20 can be between about 20 mm and about 40 mm, between about 25 mm and 35 mm, or between about 28 mm and about 32 mm. The annular shoulder 20 can have an outer diameter of about 30 mm in some aspects. Further, the annular shoulder 20 can have a thickness of between about 1.5 mm and about 4.5 mm, between about 2.0 mm and about 4.0 mm, or between about 2.5 mm and about 3.5 mm. In some aspects, the inner diameter 46 of the annular shoulder 20 is smaller than the diameter of the cylindrical shaft 28. Further, the inner, annular surface of the annular shoulder 20 can optionally be threaded. In certain aspects the annular shoulder 20 can be made of steel.

Referencing FIGS. 2A-4, the annular damper 22 can have an outer diameter 50 of between about 33 mm and about 47 mm, between about 35 mm and about 45 mm, or between about 38 mm and about 42 mm. In certain aspects, the annular damper 22 can have an outer diameter of about 40 mm. The annular damper 22 can have an outer diameter 50 that is about twice its inner diameter 52, in some aspects. Further, the annular damper 22 can have about the same inner diameter 52 as the inner diameter 46 of the annular shoulder 20. In some aspects, the annular damper 22 has an inner diameter 52 that is smaller than the diameter of the cylindrical shaft 28. In some aspects the outer diameter 50 of the annular damper 22 can be larger than the outer diameter 44 of the annular shoulder 20 by between about 3 mm and about 5 mm, between about 3.5 mm and about 4.5 mm, or between about 4 mm and about 4.5 mm. In certain aspects the outer diameter 50 of the annular damper 22 can be about 4.3 mm larger than the outer diameter 44 of the annular shoulder 20. The overlap of the annular shoulder 20 and the annular damper 22 of the overmolded-annular shoulder 32 can be between about 5 mm and about 7 mm, between about 5.5 mm and about 6.5 mm, or between about 5.8 mm and about 6.2 mm.

In certain aspects, the annular damper 22 can have a maximum thickness 48 of between about 5 mm and about 10 mm, between about 5 mm and about 7 mm, or between about 5.5 mm and about 6.5 mm. In some aspects, the annular damper 22 can have a maximum thickness of about 6 mm.

The annular damper 22 comprises at least one energy absorbing material that dissipates kinetic energy generated by an impact. The annular damper 22 can be made of at least one energy absorbing material (e.g., a rubberized material, among others) that is capable of absorbing energy from, for example, mechanical vibration or lateral forces. Elastic hysteresis of a rubberized material in the annular damper 22 can dissipate energy through material internal friction. In some aspects, the annular damper 22 includes an elastomer (such as, ethylene propylene diene monomer rubber (EPDM), among others). Exemplary energy absorbing materials for the annular damper 22 include nitrile rubber, ethylene-propylene rubber (e.g., ethylene propylene diene monomer rubber), chloroprene rubber (e.g., neoprene), styrene-butadiene rubber, ethylene acrylic rubber, natural rubber, polyurethane rubber, fluorosilicone rubber, and fluorocarbon rubber (e.g., Viton®). In certain aspects, the energy absorbing material can be an EPDM polymer, or in others a polyurethane rubber. A rubberized material included in the annular damper 22 can have a Shore A durometer of between about 50 and about 80, or between about 60 and about 70, in certain aspects. In some aspects, the rubberized material can be a polyurethane rubber having a Shore A durometer of between about 50 and about 80.

In some aspects, a striker collar 30 is employed to sleeve the cylindrical shaft 28. In these aspects, the striker 18 includes a head 26 at the end of the cylindrical shaft 28; the head 26 is generally cylindrical and has a diameter greater than the diameter of the cylindrical shaft 28. When the endgate striker assembly 12 is mounted to the side panel 8 or 10 of the cargo box 4, the larger diameter of the head 26 can prevent the overmolded-annular shoulder 32, as well as the optional striker collar 30 (if present) from sliding off the end of the cylindrical shaft 28.

Figure 4:
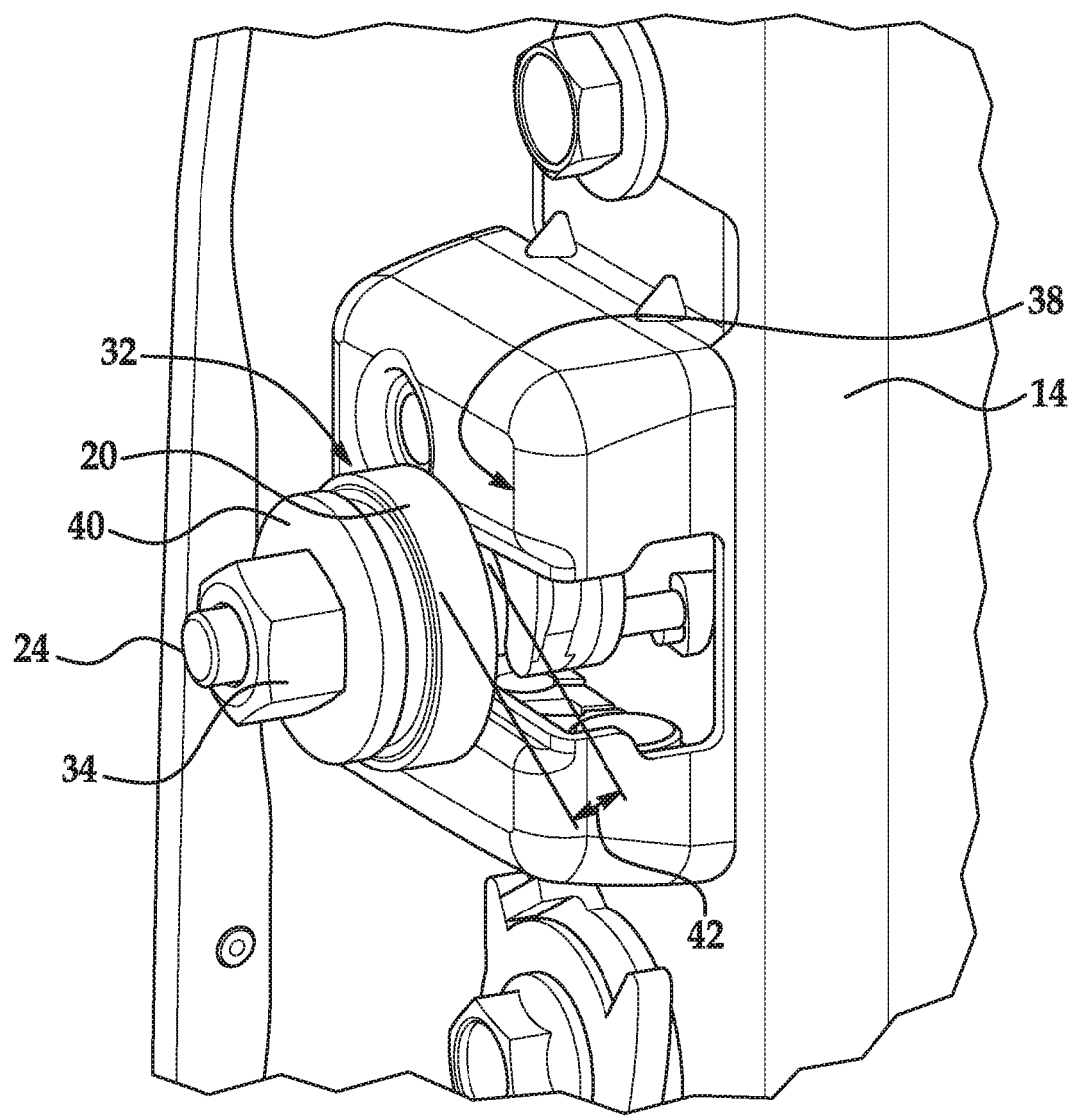
FIG. 4 is a perspective view of a mounted endgate striker assembly having an overmolded-annular shoulder engaged with a mounted endgate latch.

With reference to FIG. 4, an endgate closure includes an endgate striker assembly 12 having an annular damper 22 and an endgate latch 14 having a surface 38. The endgate latch 14 is releasably engageable with the endgate striker assembly 12. When the endgate latch 14 and the endgate striker assembly 12 are engaged and stationary (e.g., without exogenous forces, road vibrations, or lateral forces, among others being applied to the endgate closure), there is a gap 42 between the latch surface 38 of the endgate latch 14 and the annular damper 22. When an exogenous force, road vibrations or lateral forces are applied to at least one of the endgate latch 14 and the endgate striker assembly 12, the gap 42 between the latch surface 38 of the endgate latch 14 facing the striker assembly 12 and the overmolded-annular shoulder 32 (e.g., annular damper 22) becomes 0 mm. In some aspects, the gap 42 can be 0 mm when a lateral force is applied to at least one of the endgate latch and the endgate striker assembly.

Further referencing FIG. 4, the endgate latch 14 is shown engaged with the endgate striker assembly 12. The endgate latch 14 is attached to the endgate 6 and has an external surface 38 that faces the side panel 10 (not shown) to which the endgate striker assembly 12 is mounted. When the endgate latch 14 engages the endgate striker assembly 12, the head 26 and the cylindrical shaft 28, and optional striker collar 30 (if present) are latched and the endgate 6 is in its closed position. The side panel is not shown in FIG. 4, but it is positioned between (a) the nut 34 and the optional washer 40 (if present) and (b) the annular shoulder 20. The annular damper 22 is between the annular shoulder 20 and the latch surface 38 of the endgate latch 14. When the endgate latch 14 and the endgate striker assembly 12 are engaged and stationary (e.g., without applied lateral forces or road vibration, among others), there is a gap 42 between the latch surface 38 and the annular damper 22 of between about 0.1 mm and about 5 mm, between about 0.5 mm and about 2.5 mm, between about 0.1 mm and about 2 mm, or between about 1.0 mm and about 2.0 mm. In some aspects, the gap 42 is about 1.5 mm.

In certain aspects, a cargo box 4 has (a) at least one side panel 8 having a striker hole 36, (b) an endgate striker assembly 12 extending through the striker hole 36 and (c) an endgate 6 having an endgate latch 14 that is engageable with the endgate striker assembly 12 and that has a latch surface 38 facing the side panel 8. The endgate striker assembly 12 includes (a) a striker 18 having an attachment portion 24 at one end, a head 26 at the opposite end, and a cylindrical shaft 28 between the attachment portion 24 (e.g., a threaded portion, among others) and the head 26, (b) an overmolded-annular shoulder 32 and (c) a fastener 34 (e.g., a nut, among others) couplable to the attachment portion 24. The striker hole 36 has a first side facing the endgate latch 14 and a second side facing away from the endgate latch 14, and the head 26, the cylindrical shaft 28, and the overmolded-annular shoulder 32 extend from the first side and the attachment portion 24 coupled to the fastener 34 extend from the second side. The cylindrical shaft 28 is between the head 26 and the overmolded-annular shoulder 32, and the overmolded-annular shoulder 32 is between the cylindrical shaft 28 and the first side of the striker hole 36. A gap 42 between the overmolded-annular shoulder 32 and the endgate latch surface 38 is between about 0.1 mm and about 5 mm, between about 0.5 mm and about 2.5 mm, between about 0.1 mm and about 2 mm, or between about 1.0 mm and about 2.0 mm, when the endgate latch 14 is engaged with the endgate striker assembly 12, and the endgate latch 14 and the endgate striker assembly 12 are stationary. In some aspects, the gap 42 is about 1.5 m.

When an endgate striker assembly 12 is mounted to a side panel 8 or 10 and engaged by the endgate latch 14 mounted to the endgate 6 the annular damper 22 can dissipate stress on the latching and hinging components of the endgate 6 caused by lateral chucking forces, as for example, can be caused by rough road input. As forces are transmitted through/applied to the closed endgate 6 and/or cargo box 4, the annular damper 22 can simultaneously come into contact with the surface 38 of the endgate latch 14 and the annular shoulder 20 of the mounted endgate striker assembly 12. The gap 42 between the latch surface 38 and the annular damper 22 can be lost due to movement (caused by lateral forces, road vibration, etc.) of the endgate 6 or the side panel 8 or 10 to which the endgate striker assembly 12 is mounted. Thus, without the gap 42, the annular damper 22 can act as an energy absorber between the endgate 6 and the side panel 8 or 10 of the cargo box 4, and damp road vibrations or lateral forces. Stress from lateral forces generated as a vehicle 2 or trailer travels with the endgate 6 closed can cause wear and/or damage to latching and hinging components. By dissipating stress and damping vibrations, the annular damper 22 can prolong the life expectancy of the endgate hinging and latching systems.

While the best modes for carrying out the invention have been described in detail, those familiar with the art to which this invention relates will recognize various alternative designs and embodiments for practicing the invention within the scope of the appended claims.

What is claimed is:

1. An endgate striker assembly (12) engageable with an endgate latch (14), the endgate striker assembly (12) comprising:
   a striker (18) having an attachment portion (24) at one end, a head (26) at the opposite end, and a cylindrical shaft (28) between the attachment portion (24) and the head (26); and
   an overmolded-annular shoulder (32) slideably positioned between the cylindrical shaft (28) and the attachment portion (24);
   wherein the overmolded-annular shoulder (32) comprises an annular damper (22) and an annular shoulder (20); and
   wherein the annular shoulder (20) has a first surface (21) facing the cylindrical shaft (28) and an outer circumferential surface (23) and the annular damper (22) is molded over the first surface (21) of the annular shoulder (20) and at least a part of the outer circumferential surface (23).

2. The endgate striker assembly (12) of claim 1, wherein the annular damper (22) comprises a rubberized material having a Shore A durometer of between about 50 and about 80.

3. The endgate striker assembly (12) of claim 1, wherein the annular damper (22) comprises at least one of nitrile rubber, ethylene-propylene rubber, chloroprene rubber, styrene-butadiene rubber, ethylene acrylic rubber, natural rubber, polyurethane rubber, fluorosilicone rubber, and fluorocarbon rubber.

4. The endgate striker assembly (12) of claim 1, wherein the annular damper (22) comprises a polyurethane rubber.

5. The endgate striker assembly (12) of claim 1, wherein the annular damper (22) has an outer diameter (44) of between about 35 mm and about 45 mm.

6. The endgate striker assembly (12) of claim 1, wherein the annular damper (22) has a maximum thickness (48) of between about 5 mm and about 7 mm.

7. The endgate striker assembly (12) of claim 1, wherein the annular damper (22) has a maximum thickness (48) of about 6 mm.

8. The endgate striker assembly (12) of claim 1, wherein the attachment portion (24) is threaded.

9. The endgate striker assembly (12) of claim 1, further comprising a striker collar (30).

10. An endgate closure comprising:
(a) an endgate striker assembly (12) comprising:
(i) a striker (18) having an attachment portion (24) at one end, a head (26) at the opposite end, and a cylindrical shaft (28) between the attachment portion (24) and the head (26), and
(ii) an overmolded-annular shoulder (32) slideably positioned between the cylindrical shaft (28) and the attachment portion (24); wherein the overmolded-annular shoulder (32) comprises an annular damper (22) and an annular shoulder (20) having a first surface (21) facing the cylindrical shaft (28) and an outer circumferential surface (23), and wherein the annular damper (22) is molded over the first surface (21) and at least a part of the outer circumferential surface (23) of the annular shoulder; and
(b) an endgate latch (14) having a surface (38);
wherein the endgate latch (14) is engageable with the endgate striker assembly (12); and
wherein a gap (42) between the surface (38) of the endgate latch (14) and the annular damper (22) is between about 0.1 mm and about 2 mm, when the endgate latch (14) is engaged with the endgate striker assembly (12), and the endgate latch (14) and the endgate striker assembly (12) are stationary.

11. The endgate closure of claim 10, wherein the annular damper (22) comprises a rubberized material having a Shore A durometer of between about 50 and about 80.

12. The endgate closure of claim 10, wherein the annular damper (22) has an outer diameter (44) of between about 35 mm and about 45 mm.

13. The endgate closure of claim 10, wherein the annular damper (22) has a maximum thickness (48) of between about 5 mm and about 7 mm.

14. The endgate closure of claim 10, wherein the gap (42) between the surface of the endgate latch (14) and the annular damper (22) is about 1.5 mm.

15. The endgate closure of claim 10, wherein the gap (42) is 0 mm when a lateral force is applied to at least one of the endgate latch (14) and the endgate striker assembly (12).

16. The endgate closure of claim 11, wherein the attachment portion (24) is threaded.

17. The endgate closure of claim 10, further comprising a striker collar (30).

18. A cargo box comprising:
at least one side panel having a striker hole (36);
an endgate striker assembly (12) extending through the striker hole (36); and
an endgate having an endgate latch (14) engageable with the endgate striker assembly (12);
wherein the endgate latch (14) has a latch surface (38) facing the side panel (8);
wherein the endgate striker assembly (12) comprises (a) a striker (18) having an attachment portion (24) at one end, a head (26) at the opposite end, and a cylindrical shaft (28) between the attachment portion (24) and the head (26), (b) an overmolded-annular shoulder (32), and (c) a fastener (34) couplable to the attachment portion (24);
wherein the overmolded-annular shoulder (32) comprises an annular damper (22) and an annular shoulder (20), the annular shoulder (20) has a first surface (21) facing the cylindrical shaft (28) and an outer circumferential surface (23), and the annular damper (22) is molded over the first surface (21) of the annular shoulder (20) and at least a part of the outer circumferential surface (23) of the annular shoulder;
wherein the striker hole (36) has a first side facing the endgate latch (14) and a second side facing away from the endgate latch (14), and the head (26), the cylindrical shaft (28), and the overmolded-annular shoulder (32) extend from the first side of the striker hole and the attachment portion (24) coupled to the fastener (34) extend from the second side of the striker hole (36);
wherein the cylindrical shaft (28) is between the head (26) and the overmolded-annular shoulder (32), and the overmolded-annular shoulder (32) is between the cylindrical shaft (28) and the first side of the striker hole (36); and
wherein a gap (42) between the overmolded-annular shoulder (32) and the endgate latch surface (38) is between about 0.1 mm and about 2 mm, when the endgate latch (14) is engaged with the endgate striker assembly (12), and the endgate latch (14) and the endgate striker assembly (12) are stationary.

19. The cargo box of claim 18, wherein the annular damper (22) comprises a rubberized material having a Shore A durometer of between about 50 and about 80.

* * * * *